OR  3,768,889

United States

Cox

[11] 3,768,889

[5] Oct. 30, 1973

[54] OPTICAL SYSTEM HAVING DIVERTING MEANS
[75] Inventor: Arthur Cox, Park Ridge, Ill.
[73] Assignee: The Austin Company, Cleveland, Ohio
[22] Filed: Aug. 4, 1971
[21] Appl. No.: 168,892

[52] U.S. Cl..................... 350/199, 350/45, 350/50, 350/54
[51] Int. Cl........................ G02b 17/08, G02b 23/02
[58] Field of Search................... 350/199, 200, 201, 350/193, 27, 28, 29, 45, 55, 204; 356/253

[56] References Cited
UNITED STATES PATENTS
2,503,319  4/1950  Bouwers ........................ 350/199 X
2,895,372  7/1959  Tacklind et al.................. 350/199 X
2,968,209  1/1961  Aulin ............................. 350/199 X FOREIGN PATENTS OR APPLICATIONS
611,103  10/1948  Great Britain..................... 350/200

904,602  2/1954  Germany ........................... 350/199

OTHER PUBLICATIONS

Vogl et al. "A New Type of Reflecting Sight" Journal of the Optical Society of America Vol. 37, No. 12, 1947, pp. 975–978.

Primary Examiner—John K. Corbin
Attorney—Woodling, Krost et al.

[57] ABSTRACT

A Schmidt type reflector system is disclosed which is suitable to transfer information which is contained on one side of an optical axis. The invention allows access to the image without substantial loss of light due to diagonal mirrors or beam splitters used in the prior art. The system is able to operate under variable pupil conditions with a resolution approaching a diffraction limited system.

33 Claims, 4 Drawing Figures

Patented Oct. 30, 1973

INVENTOR.
ARTHUR COX

BY Woodling, Krost,
Granger & Rust
ATTORNEYS 3,768,889

OPTICAL SYSTEM HAVING DIVERTING MEANS

BACKGROUND OF THE INVENTION

This invention relates to optical systems and more particularly to optical systems incorporating a concave reflecting surface.

The use of concave reflecting surfaces to transfer images between optical planes has been known to the prior art. Among these systems are the Newtonian, the Cassegrainian, the Coude and the Gregorian. In each of these systems, the light from an object plane to a primary concave reflecting surface is partially blocked by a secondary reflecting surface required to gain access to the image plane. The amount of light blocked by the secondary reflecting surface is generally small since the systems are normally limited to a narrow field of view.

The development of the Schmidt system produced a wide field optical device incorporating a concave reflecting surface. However, the problem of access to the image plane became more acute. The area of the secondary reflecting surface had to be increased over the prior art, thus increasing the amount of light blocked. Image access is solved in the Herschel system but the system is not compatible with the Schmidt type corrector lenses.

The problem of image access to a Schmidt system has not been resolved. However, the present invention discloses an apparatus to solve this problem when the useful information is contained on one side of an optical axis.

Therefore, an object of this invention is to produce an optical system of the Schmidt type which is able to transfer information which is contained on one side of an optical axis.

Another object of this invention is to produce an optical system which will transfer information without substantial loss of light.

Another object of this invention is to produce an optical system which can be used with variable entrance and exit pupils.

Another object of this invention is to produce an optical system which is low in aberrations.

Another object of this invention is to produce an optical system with a wide field.

SUMMARY OF THE INVENTION

The invention may be incorporated in an optical system comprising in combination, a first and a second optical area, an optical axis intersecting said areas, a concave reflecting surface transferring light rays between axial points on said areas, pupil means defining said rays conveyed by the optical system, and means diverting said rays disposed on a first side of said axis in the region of said first area to be substantially symmetrically disposed about said axis in the region of said second area.

Other objects and a fuller understanding of the invention may be had by referring to the following description and claims, taken in conjunction with the accompanying drawing.

DESCRIPTION OF PREFERRED EMBODIMENTS

Figure 1:
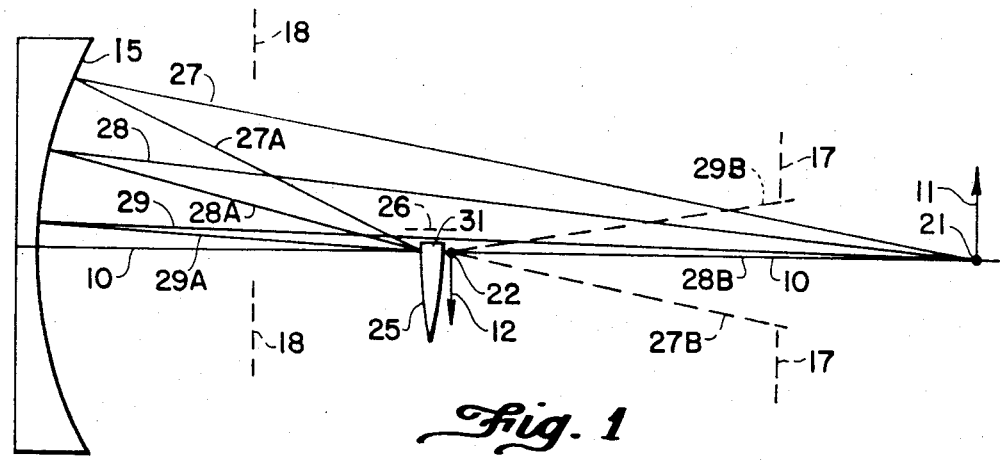
FIG. 1 is a preferred embodiment of the invention.

FIG. 1 is the preferred embodiment of the invention and includes a first optical area 11 and a second optical area 12. These optical areas can be an optical surface or a finite optical plane. The optical areas 11 and 12 intersect an optical axis 10 at axial points 21 and 22, respectively. The optical areas 11 and 12 are shown substantially perpendicular to the optical axis 10 and can represent an object plane and an image plane, for example. A concave reflecting surface 15 transfers an image between the first and second optical areas 11 and 12 as indicated by the arrows. FIG. 1 shows the reflecting surface 15 to be a spherical surface transferring light between the axial points 21 and 22. The axis of the reflecting surface 15 is shown coincident with the optical axis 10 of the optical system. Rays between the axial points 21 and 22 can be considered to be propagating in either direction, that is, from area 11 to area 12 or from area 12 to area 11. A first optical path can be defined between the optical area 11 and the reflecting surface 15 as indicated by rays 27, 28 and 29. A second optical path can be defined between the reflecting surface 15 and the second optical area 12 as illustrated by rays 27A, 28A and 29A.

FIG. 1 illustrates pupil means shown as 17 and 18 which define the rays that are transferred by the optical system. In this illustration, the pupil 17 is substantially symmetrically disposed about the optical axis 10 and defines the light rays 27B, 28B and 29B that are transferred by the optical system. If optical area 11 is an object plane and optical area 12 is an image plane, then pupil 17 would be the exit pupil and pupil 18 would be the entrance pupil of the optical system. Although the pupil 17 defines the rays which are transferred by the optical system, the pupil is located outside of the first and second optical paths. Pupil 17 can be considered to be restricting the rays 27B, 28B and 29B diverging from point 22 or can be considered to be restricting rays converging to the axial point 22. Irrespective of the direction of the rays, the pupil 17 determines the rays propagating between axial point 22 and 21 which will be passed by the optical system. In this example, rays 27 and 29 illustrate the maximum angle in the first optical path of rays between the axial point 21 and the reflecting surface 15 which will be passed by the optical system.

FIG. 1 also illustrates means 25 which diverts rays defined by the pupil means 17 in such a way that the rays 27, 28 and 29 which are disposed on a first side of the axis 10 in the region of the first optical area 11 are diverted to be substantially symmetrically disposed about the optical axis 10 in the region of the second area 12 as shown by rays 27B, 28B and 29B. The rays 27, 28 and 29 that comprise the first optical path are allowed to impinge upon the reflecting surface 15 without interference, whereas the rays 27A, 28A and 29A that comprise the second optical path impinge upon the means 25 to be diverted and to become symmetrically disposed about the optical axis 10. The diverting means 25 could also be located in the optical area 12 or just outside of the second optical path without any substantial change in function. Thus, the invention transforms a defined bundle of rays from an axial point which are unsymmetrically disposed about one-half of the optical axis into a bundle of rays substantially symmetrically disposed about the optical axis without any interference with a secondary reflecting surface.

The means 25 diverting the rays can be described as an offset field lens means. The field lens means functions as both a field lens and as a prism. The field lens means 25 is a semicircular or lesser portion of a lens having a given diameter and focal length. The lens is located in the region of the second optical area 12 with the preponderance of the field lens means on one side of the optical axis 10 and the lens axis 26 located on the other side of the optical axis 10. The lens axis 26 is displaced from and substantially parallel to the optical axis 10. FIG. 1 shows the one side to be the second side. The rays between the axial points 21 and 22 impinge upon and are diverted by the field lens means 25 in one of the optical paths or the extension thereof and circumvent the field lens means 25 in the other of the optical paths. The chord 31 of the semi-circular portion of the field lens means 25 is located in proximity to the optical axis 10 and parallel to a plane through the optical axis 10 which is parallel to the line separating the first and second optical areas 11 and 12. The offset field lens means 25 could be replaced by a centered field lens and a prism. In this arrangement, the field lens would be necessary to divert rays from non-axial points on the optical areas 11 and 12, whereas the prism would be necessary to divert rays from the axial points 21 and 22.

Figure 2:
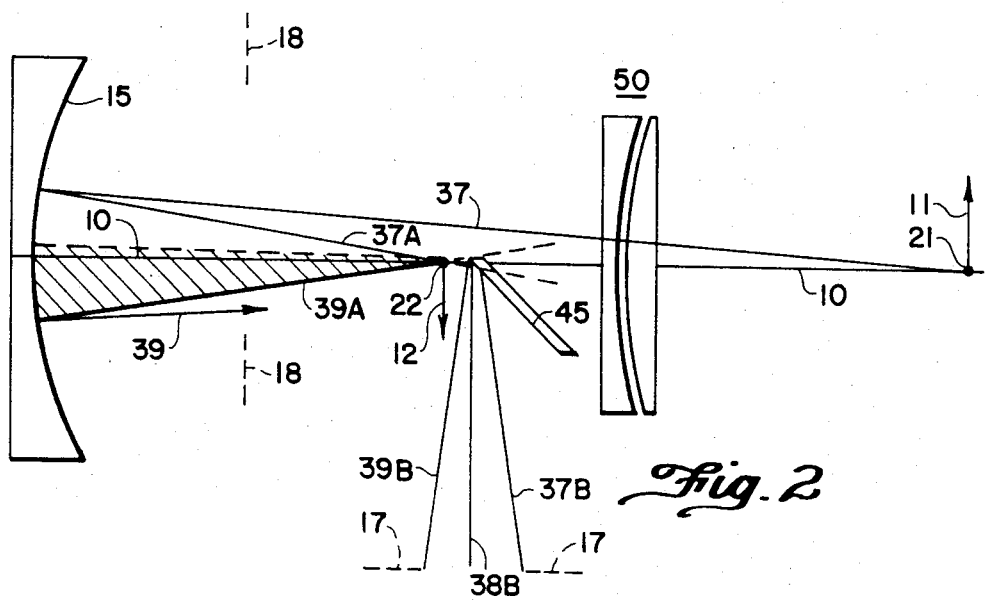
FIG. 2 is a prior art Schmidt type system used to transfer information contained on one side of an optical axis.

FIG. 2 shows a Schmidt system known to the prior art. The system includes an optical axis 10, a spherical concave reflecting surface 15, a first and a second optical area 11 and 12 having axial points 21 and 22, respectively. The system also includes aberration corrector means 50 and pupil means 17 and 18 which may be the exit pupil 17 and entrance pupil 18 of the optical system. A secondary reflecting surface 45 located near the second optical area 12 diverts rays on the optical axis 10 in a direction normal to the optical axis 10 as shown by ray 38B. A reflecting surface of this type is typically found in a Newtonian and a Coude type reflecting telescope. The light rays 37B and 39B converging from the pupil 17 to the axial point 22 on the second optical area 12 represent the extremity of the rays which will be transmitted by the optical system. After reflection by the reflecting surface 45, the rays 37B, 38B and 39B converge to the axial point 22 substantially symmetrically disposed about the optical axis 10 and diverge as rays 37A, 38A and 39A, respectively, from axial point 22. Upon reflection less than one-half of the rays between the maximum rays 37 and 39 will converge to the axial point 21. In the configuration shown in FIG. 2, the rays above ray 39 within the shaded portion will be lost in the transfer from the axial point 22 to the axial point 21. If rays are assumed to be propagating from axial point 21 to axial point 22, the rays which are on the first side of the optical axis in the region of the first optical area 11 are not diverted to be substantially symmetrically disposed about the optical axis in a region of second area 12 and only one-half of pupil 17 will contain light from the axial point 21. Thus, the prior art Schmidt system attempting to transfer one-half of an area about an axis did so at the expense of 50 percent of the available light.

Figure 3:
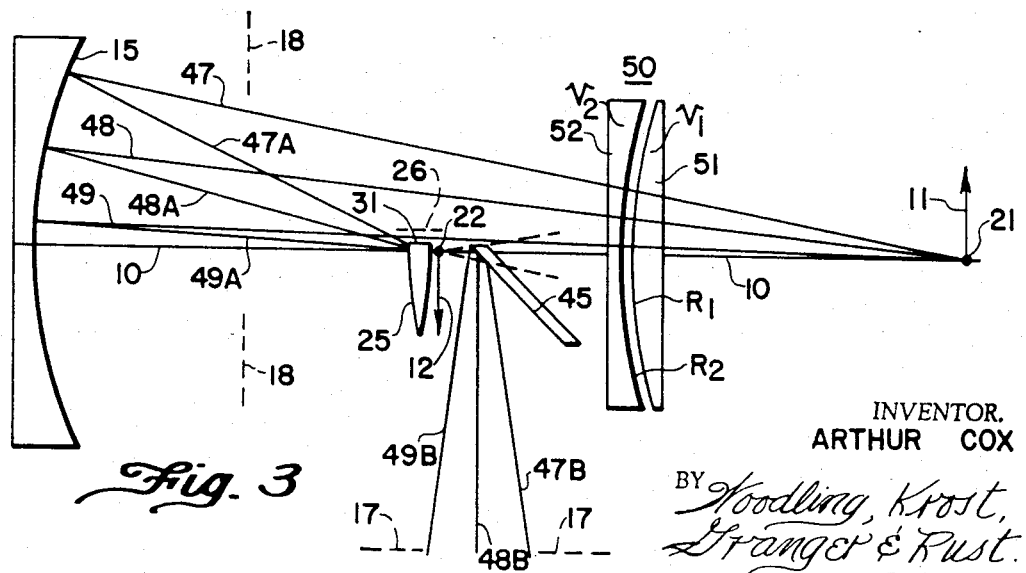
FIG. 3 shows a modification of the preferred embodiment shown in FIG. 1.

FIG. 3 illustrates an arrangement similar to the prior art system shown in FIG. 2 but incorporating the invention shown in the preferred embodiment FIG. 1. FIG. 3 contains the essential structure of FIG. 1 plus aberration corrector means 50 and a secondary reflecting surface 45. Pupil means 17 determines the rays transferred by the optical system and after reflection from the secondary reflecting surface 45, rays 47B, 48B and 49B converge to the axial point 22 substantially symmetrically disposed about the optical axis 10. The presence of the diverting means 25 in FIG. 3 allows the rays 47B–49B to be diverted as rays 47A–49A, respectively, and to be reflected as rays 47–49 to be disposed about the first side of the optical axis in the region of the first optical area 11 without any loss of the rays. The pupil 17 is entirely filled.

The aberration corrector means shown generally as 50 is located within the first optical path which includes rays 47, 48 and 49 and comprises two lenses spaced from the reflecting surface 15 at a distance S. A first lens 51 has a radius $R_1$ and an Abbe number $\nu_1$. A second lens 52 has a radius $R_2$ and an Abbe number $\nu_2$. The radii of the first and second lenses must be chosen in accordance with the radius of curvature $R_m$ of the concave reflecting surface 15. Although the corrector means is shown situated in the first optical path, the corrector means could be placed within the second optical path or in close proximity to the reflecting surface 15 as in a Mangin mirror.

Figure 4:
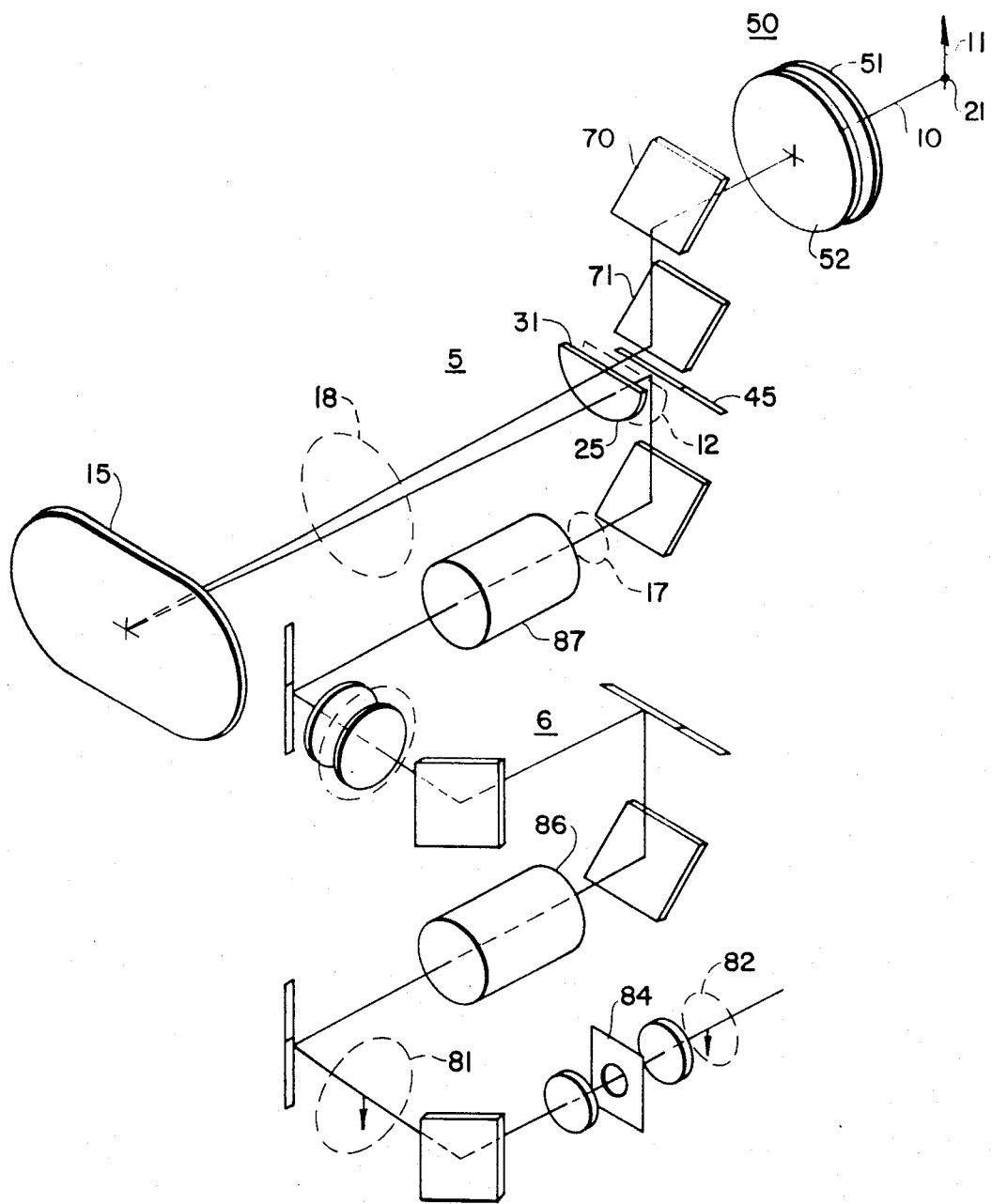
FIG. 4 shows an application for the invention shown in FIGS. 1 and 3.

FIG. 4 shows an application of the invention shown in FIGS. 1 and 3. The simulator device shown in FIG. 4 can be divided into a portion shown generally at 5 which is the invention described in FIGS. 1 and 3 and a variable magnification relay portion shown generally as 6. The relay portion transfers images formed on the second optical area 12 to an optical plane 81 with variable magnification. An image present at the optical plane 81 is transferred through an aperture 84 to a final image plane 82. The aperture 84 determines the exit pupil of the entire simulator device. The entrance pupil of the relay portion 6 is the exit pupil 17 of the optical system 5. The relay portion has a fixed exit pupil and operates under variable magnification conditions implying a movement of the pupil 17. Therefore the optical system portion 5 must be able to accommodate an exit pupil 17 and an entrance pupil 18 of variable size and position. The reflecting surfaces 70 and 71 allow only the light propagating from an optical area on one side of the optical axis 10 to impinge upon the reflecting surface 15.

The simulator device shown in FIG. 4 has valuable applications in the area of military training devices such as a periscope view simulator or an aircraft view simulator. In each of these cases, the information of interest is contained on one side of an optical axis. For example, in a periscope view simulator, the useful information such as a ship will be contained above the horizon and the area below the horizon will be occupied exclusively by water. To simulate the approach of a ship, it would be desirable to transfer the area above the horizon with variable magnification and superimpose the area below the horizon with water of a fixed magnification.

The usefulness of the invention described in FIGS. 1 and 3 becomes apparent in the application shown in FIG. 4. In the prior art system shown in FIG. 2, rays from the axial point 21 on a ship's model included in the optical area 11 will fill only one-half of the pupil 17. Therefore, in the prior art system, the only rays from point 21 which will be available to a lens 87 which is the first lens in the variable magnification relay system will be contained between rays 37B and 38B. The prior art system has transferred an image of the model on the first optical area 11 at the expense of 50 percent loss in light level. When the invention shown in FIG. 3 is incorporated into the simulator device, the pupil 17 is completely filled. Lens 87 has a full pupil 17 without any substantial loss of light in the transferring process by the optical system 5. In addition, the negative Petzval sum of optical system portion 5 compensates for a positive Petzval sum of the relay portion 6. This produces a high quality image at the final image plane 82 which is substantially free from curvature of field.

In an actual system constructed by the inventor in accordance with FIG. 4, the optical system portion 5 functioned at a 3.5:1 reduction at $f$ 4.7 and was able to accommodate for variable entrance and exit pupils. The system used spherical correcting surfaces in the first and second lenses 51 and 52 to correct for spherical aberration and resulted in almost a perfect correction of spherical aberration and sphero-chromatism. The coma of the optical system portion 5 was below the value required for a diffraction limited system. This level of refinement was achieved by the following parameters where $R_1$, $R_2$ and $\nu_1$, $\nu_2$ are the radii and Abbe numbers of lenses 51 and 52, respectively, $R_m$ is the radius of curvature of reflecting surface 15 and S is the separation between the reflecting surface 15 and lenses 51 and 52:

$$0.9 < \nu_1/\nu_2 < 1.1$$
$$0.5\,(1/R_m) < 1/R_1 - 1/R_2 < 1/R_m$$
$$0.4\,R_m < R_1 < 0.65\,R_m$$
$$0.3\,R_m < R_2 < 0.50\,R_m$$
$$0.6\,R_m < S < 1.0\,R_m$$

By virtue of the high quality optical system 5 contained within the simulator device, a variable magnification simulator device has been created capable of variations in magnification of 40:1 and approaching diffraction limited operation.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

I claim:

1. An optical system, comprising in combination, a first and a second optical area, an optical axis intersecting said areas, a concave reflecting surface transferring light rays between axial points on said areas, pupil means defining said rays conveyed by the optical system, said pupil means being substantially symmetrically disposed about said axis, and diverting means cooperating with said concave reflecting surface for diverting said rays disposed on a first side of said axis from an axial point on said first area to be substantially symmetrically disposed about said axis in the region of said second area.

2. An optical system as set forth in claim 1, wherein said optical areas are finite optical planes.

3. An optical system as set forth in claim 1, wherein said optical areas are located on opposite sides of said optical axis.

4. An optical system as set forth in claim 1, wherein the axis of said concave reflecting surface is coincident with said optical axis.

5. An optical system as set forth in claim 1, wherein said concave reflecting surface is substantially spherically concave, and including aberration corrector means for said reflecting surface.

6. An optical system as set forth in claim 1, wherein said pupil means includes the exit pupil of the optical system.

7. An optical system as set forth in claim 1, wherein said diverting means includes field lens means having a field lens axis displaced from said optical axis.

8. An optical system as set forth in claim 1, wherein said diverting means is located in the region of said second optical area.

9. An optical system, comprising in combination, a first and a second optical area, an optical axis intersecting said areas, said first and second areas being on a first and second side of said axis, respectively, a concave reflecting surface transferring light rays between said areas, an exit pupil and an entrance pupil wherein one of said pupils is substantially symmetrically disposed about said axis, said one of said pupils defining said rays conveyed by the optical system, diverting means including, field lens means having a preponderance of said field lens means on one of said sides, and means locating said field lens means in the region of said second area to divert said rays disposed on said first side from an axial point on said first area to be substantially symmetrically disposed about said axis in the region of said second area.

10. An optical system as set forth in claim 9, wherein one of said areas includes an image plane and the other of said areas includes an object plane.

11. An optical system as set forth in claim 9, wherein said concave reflecting surface is substantially spherically concave, and including aberration corrector means for said reflecting surface.

12. An optical system as set forth in claim 11, wherein said aberration corrector means includes corrector lens means.

13. An optical system as set forth in claim 11, wherein the axes of said concave reflecting surface and said aberration corrector lens means are coincident with said optical axis.

14. An optical system as set forth in claim 9, wherein said one of said pupils includes said exit pupil.

15. An optical system as set forth in claim 9, wherein said one of said sides is said second side and said other of said sides is said first side.

16. An optical system as set forth in claim 9, wherein the field lens axis of said field lens means is substantially parallel to and displaced from said optical axis and located on the other of said sides.

17. An optical system as set forth in claim 16, wherein said field lens means is less than a semicircular portion of a given lens.

18. An optical system as set forth in claim 9, including a first and a second optical path between said reflecting surface and said first and second areas, respectively.

19. An optical system as set forth in claim 18, wherein said locating means locates said field lens means to be out of one of said optical paths to circumvent rays from said axial point on said first area and to intersect rays in the other of said optical paths.

20. An optical system as set forth in claim 19, wherein said one of said optical paths is said second optical path.

21. An optical system, comprising in combination,
a first and a second optical area,
an optical axis intersecting said areas,
said first and second areas being on a first and a second side of said axis, respectively,
a spherical concave reflecting surface transferring light rays between said areas,
a first and a second optical path between said reflecting surface and said first and second optical areas, respectively,
aberration corrector means for said spherical concave reflecting surface,
the axes of said concave reflecting surface and said aberration corrector means being coincident with said optical axis,
an exit pupil and an entrance pupil,
said exit pupil being substantially symmetrically disposed about said optical axis and defining said rays conveyed by the optical system,
field lens means less than a semicircular portion of a given lens and located in the region of said second area with a preponderance of said field lens means on said second side,
the field lens axis of said field lens means being substantially parallel to and displaced from said optical axis and being located on said first side of said optical axis,
and means locating said field lens means to be out of said first optical path to circumvent rays disposed on said first side from an axial point on said first area and to be impinged by rays in said second optical path and to divert same to be substantially symmetrically disposed about said axis in the region of said second area.

22. An optical system as set forth in claim 21, wherein said first and second areas are optical planes and are each substantially perpendicular to said optical axis.

23. An optical system as set forth in claim 21, wherein said first optical area includes an object plane and said second optical area includes an image plane.

24. An optical system as set forth in claim 21, wherein said aberration corrector means is located in said first optical path.

25. An optical system as set forth in claim 21, wherein the optical system has a negative Petzval sum.

26. An optical system as set forth in claim 21 wherein said first area includes means blocking light rays propagating from one-half of an area about said optical axis from impinging upon said reflecting surface.

27. An optical system as set forth in claim 21, wherein said exit pupil is located outside of said optical paths.

28. An optical system as set forth in claim 21, wherein said field lens means includes a field lens means having a chord and wherein said chord is located in proximity to said optical axis and substantially parallel to a plane separating said sides containing said optical axis.

29. An optical system as set forth in claim 21, wherein said aberration corrector lens means includes a first and a second lens having Abbe numbers $\nu_1$, $\nu_2$ and radii $R_1$, $R_2$, respectively, and wherein $R_m$ is the radius of curvature of said spherically concave reflecting surface.

30. An optical system as set forth in claim 29, wherein:

$$0.9 < \nu_1/\nu_2 < 1.1.$$

31. An optical system as set forth in claim 29, wherein:

$$0.5 \, 1/R_m < 1/R_1 - 1/R_2 < 1/R_m$$

32. An optical system as set forth in claim 29, wherein:

$$0.4 \, R_m < R_1 < 0.65 \, R_m$$
$$0.3 \, R_m < R_2 < 0.50 \, R_m.$$

33. An optical system as set forth in claim 29, wherein said aberration corrector means is spaced from said reflecting surface by a distance $S$ wherein:

$$0.6 \, R_m < S < 1.0 \, R_m.$$

* * * * *